United States Patent
Wang et al.

(10) Patent No.: US 12,308,597 B2
(45) Date of Patent: May 20, 2025

(54) DISTRIBUTED WEAK GRATING ARRAY SENSING SYSTEM AND METHOD WITH MULTIPLE DEMODULATION MODES

(71) Applicant: NANJING UNIVERSITY, Nanjing (CN)

(72) Inventors: Feng Wang, Nanjing (CN); Rui Hong, Nanjing (CN); Xuping Zhang, Nanjing (CN); Yixin Zhang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 203 days.

(21) Appl. No.: 18/116,856

(22) Filed: Mar. 3, 2023

(65) Prior Publication Data

US 2024/0039227 A1 Feb. 1, 2024

(30) Foreign Application Priority Data

Jul. 27, 2022 (CN) .................. 202210892621.X

(51) Int. Cl.
*H01S 3/00* (2006.01)
*G01H 9/00* (2006.01)
(Continued)

(52) U.S. Cl.
CPC ........... *H01S 3/0085* (2013.01); *G01H 9/004* (2013.01); *G02F 1/113* (2013.01); *H01S 3/06716* (2013.01)

(58) Field of Classification Search
CPC .. H01S 3/0085; H01S 3/06716; H01S 3/1608; H01S 3/06754; G01H 9/004;
(Continued)

(56) References Cited

U.S. PATENT DOCUMENTS 5,987,197 A * 11/1999 Kersey ............... G01D 5/35383
385/12
6,204,920 B1 * 3/2001 Ellerbrock .............. G01L 1/246
356/477
(Continued)

FOREIGN PATENT DOCUMENTS

| CN | 111157101 A | * | 5/2020 | |
| CN | 107505041 B | * | 9/2021 | ......... G01D 5/35374 |
| CN | 110617874 B | * | 11/2021 | ............. G01H 9/004 |

OTHER PUBLICATIONS

Xuping et al. "A High Performance Distributed Optical Fiber Sensor Based on Φ-OTDR for Dynamic Strain Measurement" 2017, in IEEE Photonics Journal, vol. 9, No. 3, pp. 1-12.*

(Continued)

*Primary Examiner* — Hoa Q Pham
(74) *Attorney, Agent, or Firm* — Bayramoglu Law Offices LLC

(57) ABSTRACT

A distributed weak grating array sensing system and method with multiple demodulation modes are provided for optical fiber sensing. The distributed weak grating array sensing method includes: amplitude modulating, by an acousto-optic modulator, a laser light to form a double-pulse light satisfying a preset requirement; linearly phase modulating, by a phase modulator, a phase of front pulse light or rear pulse light of the double-pulse light; amplifying double-pulse light after amplitude modulation and phase modulation, and introducing the double-pulse light into a grating array; allowing reflected light of the double-pulse light on adjacent gratings to superimpose and form interference light; introducing the interference light into a photoelectric detector; acquiring, by an acquisition card, data; locating a disturbance through the amplitude fluctuation; accurately acquiring a sampling number corresponding to $2\pi$; and selecting $\pi/2$ phase difference demodulation, $2\pi/3$ phase difference demodulation, $\pi/4$ (Continued)

phase difference demodulation, proposed N-step phase difference demodulation as required.

7 Claims, 7 Drawing Sheets

(51) Int. Cl.
*G02F 1/11* (2006.01)
*H01S 3/067* (2006.01)

(58) Field of Classification Search
CPC ...... G02F 1/113; G01D 5/38; G01D 5/35316;
G01D 5/35383
USPC ...... 356/35.5, 478, 73.1; 385/12, 24, 13, 37;
250/227.23, 227.14, 227.18, 227.19
See application file for complete search history.

(56) References Cited

U.S. PATENT DOCUMENTS 11,193,818 B2 * 12/2021 Jin .................... G01D 5/35316
2006/0028636 A1 * 2/2006 Payton ............... G01M 11/3172
356/73.1

OTHER PUBLICATIONS

CN-111157101-A, Machine Translation, 2020.*
CN-110617874-B, Machine Translation, 2021.*
CN-107505041-B, Machine Translation, 2021.*

* cited by examiner

DISTRIBUTED WEAK GRATING ARRAY SENSING SYSTEM AND METHOD WITH MULTIPLE DEMODULATION MODES

CROSS REFERENCE TO THE RELATED APPLICATIONS

This application is based upon and claims priority to Chinese Patent Application No. 202210892621. X, filed on Jul. 27, 2022, the entire contents of which are incorporated herein by reference.

TECHNICAL FIELD

The present disclosure relates to the technical field of optical fiber sensing, particularly to a distributed weak grating array sensing system and method with multiple demodulation modes.

BACKGROUND

Optical fiber sensing technology originated in the 1970s and developed rapidly with the advent of low-loss optical fibers. After nearly 50 years of research and development, optical fiber sensing technology is becoming increasingly more developed in all aspects and has been applied in military, security, industrial, and other fields.

Optical fiber sensing technology uses an optical fiber as the transmission medium and sensing element and uses a light wave as the carrier of external signals. The light wave propagates in the optical fiber. When the external temperature, strain, vibration, and other environmental factors change, some characteristic parameters of the light wave, such as frequency, polarization state, and phase, will change accordingly to generate backscattered light modulated by the external information. After the relevant parameters of the light wave are detected, the information loaded on the light wave can be demodulated to acquire the changes in the environment in which the optical fiber is located.

The distributed weak grating array adopts the following sensing principles. A weak grating array embedded in the optical fiber serves as a set of "weak mirrors" and provides a stable and controllable reflected light signal at a designated position of the optical fiber. The reflected light signal replaces spontaneous Rayleigh scattering in the optical fiber. The external disturbance signal can be acquired by demodulating the phase, power, and other changes of the interference light. Compared with the traditional optical fiber sensing system, the distributed weak grating array sensing system can acquire a more stable reflected light signal and a higher signal-to-noise ratio (SNR).

The optical fiber sensing technology adopts a variety of demodulation modes, including π/2 phase difference demodulation, 2π/3 phase difference demodulation, and π/4 phase difference demodulation, etc. These demodulation modes have their advantages and disadvantages and are suitable for different actual scenarios. Different demodulation modes mean different system structures. The actual application requirements are changeable, but it is unrealistic to change the system in real-time to adapt to the change in the requirements. At present, no sensing system or method can realize multiple demodulation modes and can be applied to different scenarios.

In addition, π/2 phase difference demodulation, 2π/3 phase difference demodulation, and π/4 phase difference demodulation require a stable phase difference. However, because the half-wave voltage of the phase modulator is unstable, the stability of the phase difference is difficult to guarantee.

SUMMARY

An objective of the present disclosure is to provide a distributed weak grating array sensing system and method with multiple demodulation modes to solve problems existing in the prior art.

To achieve the above objective, the present disclosure provides the following technical solutions.

A distributed weak grating array sensing system with multiple demodulation modes includes a narrow-linewidth laser, an acousto-optic modulator, a phase modulator, a double-pulse signal generator, a signal generator, an erbium-doped fiber amplifier, a circulator, a sensing fiber fused with a weak grating array, a photoelectric detector, a data acquisition card, and a computer.

The narrow-linewidth laser is configured to emit continuous light to the acousto-optic modulator.

The double-pulse signal generator is configured to control the acousto-optic modulator and send out a synchronous signal as a trigger signal of the signal generator.

The acousto-optic modulator is configured to modulate the continuous light under the control of the double-pulse signal generator to generate double-pulse light with a specified width and spacing.

The phase modulator is configured to modulate a phase of front pulse light or rear pulse light of the double-pulse light under the control of the signal generator to linearly increase the phase of a corresponding partial region of phase modulation.

The erbium-doped fiber amplifier is configured to amplify the power of the double-pulse light output by the phase modulator and output the double-pulse light to the circulator, such that the double-pulse light enters the sensing fiber through the circulator.

The sensing fiber is configured to enable reflected light of the double-pulse light to superimpose and interfere in gratings to generate interference light, where the interference light returns to the circulator.

The photoelectric detector is configured to convert a returned interference light signal into a corresponding electrical signal and output the electrical signal to the data acquisition card, and the data acquisition card is configured to digitize the electrical signal and output the electrical signal to the computer.

The computer is configured to analyze acquired time-domain signals, locate a disturbance by observing a fluctuation of a reflection peak signal, acquire N signals with different modulated phases in a phase period from photocurrent signals at a disturbance position, and select, for photocurrent signals with a phase difference of Φ, photocurrent signals with a sampling number difference of ΦN/2π for demodulation.

Preferably, the double-pulse light with a specified width and spacing modulated by the acousto-optic modulator includes two pulses with a width of $t_1$ and a spacing satisfying $$t_2 = \frac{2nL}{c},$$

where c denotes a propagation speed of light in vacuum, n denotes an equivalent refractive index of the sensing fiber, and L denotes a spacing between every two adjacent gratings in the grating array.

Preferably, a control electrical signal sent by the signal generator has the same period as a control electrical signal of the double-pulse signal generator and has a voltage change from 0 V to $2V_\pi$, $V_\pi$ denotes a half-wave voltage of the phase modulator.

Preferably, the phase modulator is configured to modulate the phase of the front pulse light or the rear pulse light, where an electric field of the reflected light of the front pulse light is expressed as:

$$E_1(t) = E_{r1} \exp[j\omega t + j\varphi_1 + j\Delta\varphi(t) + \psi(x)].$$

An electric field of the reflected light of the rear pulse light is expressed as:

$$E_2(t) = E_{r2} \exp[j\omega t + j\varphi_2];$$

The reflected light of the front pulse light and the reflected light of the rear pulse light interfere after superposition, and the interference light signal is expressed as:

$$I_1(t) = E_{r1}^2 + E_{r2}^2 + 2E_{r1}E_{r2} \cos[\Delta\phi + \Delta\varphi(t) + \psi(x)], \text{ where}$$

$$\Delta\phi = \varphi_1 - \varphi_2.$$

Ignoring the initial phase difference and the direct current (DC) term of the two beams of reflected light, the interference light signal is expressed as:

$$I_1(t) = 2E_{r1}E_{r2} \cos[\Delta\varphi(t) + \psi(x)],$$

where the reflected light of the front pulse light has a light field distribution of $E_1$, an angular frequency of $\omega$, an initial phase of $\varphi_1$, and an electric field amplitude of $E_{r1}$; the reflected light of the rear pulse light has a light field distribution of $E_2$, an angular frequency of $\omega$, an initial phase of $\varphi_2$, and an electric field amplitude of $E_{r2}$; $\Delta\varphi(t)$ denotes a phase change caused by an external disturbance at a time t; $\psi(x)$ denotes a phase change introduced by the phase modulator; $\psi(x)$ denotes a function with a value that increases linearly with an increase of a position x; there is a period of $2\pi$ between a value of the interference light signal and $\psi(x)$.

A distributed weak grating array sensing method with multiple demodulation modes includes the following steps:

S1: generating continuous light and modulating an amplitude of the continuous light to divide the continuous light into front pulse light and rear pulse light, where the front pulse light has a width equal to the width of the rear pulse light;

S2: linearly modulating a phase of the front pulse light or the rear pulse light to linearly increase the phase of a corresponding partial region;

S3: compensating, by an erbium-doped fiber amplifier, the rear pulse light and compensating the front pulse light after the phase modulation processing; inputting a compensation result into a sensing fiber; detecting, by a photoelectric detector, an interference signal generated by the superimposition of reflected light on adjacent gratings; and digitizing, by a data acquisition card, an acquired electrical signal to acquire a time-domain signal of interference light;

S4: analyzing acquired time-domain signals and locating a disturbance by observing a fluctuation of a reflection peak signal;

S5: acquiring N signals with different modulated phases in a phase period from photocurrent signals at a disturbance position;

S6: determining a phase demodulation method according to an actual requirement; selecting $2\pi/3$ phase difference demodulation for a disturbance with a strain greater than a preset strain threshold, otherwise selecting $\pi/4$ phase difference demodulation; selecting $\pi/2$ phase difference demodulation for a disturbance desiring a demodulation speed greater than a preset demodulation speed threshold; selecting N-step phase difference demodulation for a disturbance desiring a demodulation result not to be affected by fading and using all signals with a phase difference at the disturbance position; and S7: acquiring multiple sets of demodulation results from the photocurrent signals at the disturbance position and acquiring a final demodulation result by averaging.

Preferably, in step S1, the modulating an amplitude of the continuous light to divide the continuous light into front pulse light and rear pulse light specifically includes:

controlling an acousto-optic modulator through a double-pulse control electrical signal with a voltage change from 0 V to $2V_\pi$; and modulating, by the acousto-optic modulator, the amplitude of the continuous light;

where $V_\pi$ denotes a half-wave voltage of a phase modulator.

Preferably, the sensing method further includes selecting the photocurrent signals according to different phase differences, where, in step S5, the phase period is $2\pi$:

for $\pi/2$ phase difference demodulation, selecting two photocurrent signals with a phase difference of ¼ periods for demodulation;

for $2\pi/3$ phase difference demodulation, selecting three photocurrent signals with a phase difference of ⅓ periods for demodulation;

for $\pi/4$ phase difference demodulation, selecting four photocurrent signals with a phase difference of ⅛ periods for demodulation; and for N-step phase difference demodulation, selecting $N_{max}$ photocurrent signals for demodulation;

where N is a positive integer greater than or equal to 1, and $N_{max}$ is the total sampling number of the grating at the disturbance position.

Compared with the prior art, the present disclosure has the following beneficial effects.

First, the present disclosure can realize multiple demodulation modes including $\pi/2$ phase difference demodulation, $2\pi/3$ phase difference demodulation, $\pi/4$ phase difference demodulation, and N-step phase difference demodulation without changing the system structure to meet different application requirements.

Second, the present disclosure eliminates the influence of the instability of the half-wave voltage of the phase modulator and ensures the stability of the phase difference of the photocurrent signals used for demodulation.

BRIEF DESCRIPTION OF THE DRAWINGS

To describe the technical solutions in the embodiments of the present disclosure or the prior art more clearly, the following briefly describes the drawings required for describing the embodiments or the prior art. The drawings in the following description merely show the embodiments of the present disclosure, and those of ordinary skill in the art may still derive other drawings from the provided drawings without creative efforts.

DETAILED DESCRIPTION OF THE EMBODIMENTS

Figure 1:
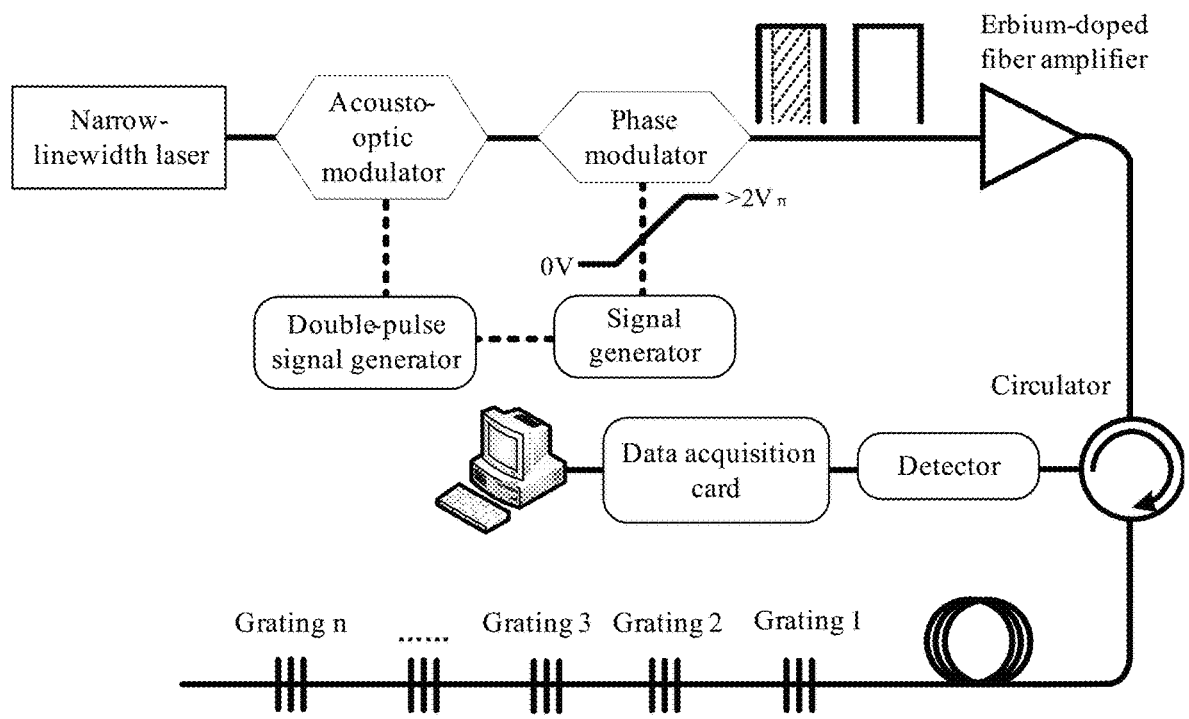
FIG. 1 is a structural diagram of a distributed weak grating array sensing system with multiple demodulation modes according to an embodiment of the present disclosure.

The technical solutions of the embodiments of the present disclosure are clearly and completely described below by referring to the drawings. The described embodiments are merely a part, rather than all, of the embodiments of the present disclosure. All other embodiments obtained by those of ordinary skill in the art based on the embodiments of the present disclosure without creative efforts should fall within the protection scope of the present disclosure.

Embodiment 1

This embodiment provides a distributed weak grating array sensing system with multiple demodulation modes. The distributed weak grating array sensing system includes a narrow-linewidth laser, an acousto-optic modulator, a phase modulator, a double-pulse signal generator, a signal generator, an erbium-doped fiber amplifier, a circulator, a sensing fiber fused with a weak grating array, a photoelectric detector, a data acquisition card, and a computer.

The narrow-linewidth laser is configured to emit continuous light to the acousto-optic modulator.

The double-pulse signal generator is configured to control the acousto-optic modulator and send out a synchronous signal as a trigger signal of the signal generator.

The acousto-optic modulator is configured to modulate the continuous light under the control of the double-pulse signal generator to generate double-pulse light with a specified width and spacing.

The phase modulator is configured to modulate a phase of the front pulse light or rear pulse light of the double-pulse light under the control of the signal generator to linearly increase the phase of a corresponding partial region of phase modulation.

The erbium-doped fiber amplifier is configured to amplify the power of the double-pulse light output by the phase modulator and output the double-pulse light to the circulator, such that the double-pulse light enters the sensing fiber through the circulator.

The sensing fiber is configured to enable reflected light of the double-pulse light to superimpose and interfere in gratings to generate interference light, where the interference light returns to the circulator.

The photoelectric detector is configured to convert a returned interference light signal into a corresponding electrical signal and output the electrical signal to the data acquisition card, and the data acquisition card is configured to digitize the electrical signal and output the electrical signal to the computer.

The computer is configured to analyze acquired time-domain signals, locate a disturbance by observing a fluctuation of a reflection peak signal, acquire N signals with different modulated phases in a phase period at a disturbance position, and select, for photocurrent signals with a phase difference of $\Phi$, photocurrent signals with a sampling number difference of $\Phi N/2\pi$ for demodulation.

Specifically:

The double-pulse light with a specified width and spacing modulated by the acousto-optic modulator includes two pulses with a width of $t_1$ and a spacing satisfying $$t_2 = \frac{2nL}{c},$$

where c denotes a propagation speed of light in vacuum, n denotes an equivalent refractive index of the sensing fiber, and L denotes a spacing between every two adjacent gratings in the grating array.

A control electrical signal sent by the signal generator has the same period as a control electrical signal of the double-pulse signal generator and has a voltage change from 0 V to $2V_\pi$, $V_\pi$ denotes a half-wave voltage of the phase modulator.

The phase modulator is configured to modulate the phase of the front pulse light or the rear pulse light, where an electric field of the reflected light of the front pulse light is expressed as:

$$E_1(t)=E_{r1} \exp[j\omega t+j\varphi_1+j\Delta\varphi(t)+\psi(x)].$$

An electric field of the reflected light of the rear pulse light is expressed as:

$$E_2(t)=E_{r2} \exp[j\omega t+j\varphi_2];$$

The reflected light of the front pulse light and the reflected light of the rear pulse light interfere after superposition, and the interference light signal is expressed as:

$$I_1(t)=E_{r1}^2+E_{r2}^2+2E_{r1}E_{r2} \cos[\Delta\phi+\Delta\varphi(t)+\psi(x)], \text{ where}$$

$$\Delta\phi=\varphi_1-\varphi_2.$$

If an initial phase difference and a direct current (DC) term of the two beams of reflected light are ignored, the interference light signal is expressed as:

$$I_1(t)=2E_{r1}E_{r2} \cos[\Delta\varphi(t)+\psi(x)],$$

where the reflected light of the front pulse light has a light field distribution of $E_1$, an angular frequency of $\omega$, an initial phase of $\varphi_1$, and an electric field amplitude of $E_{r1}$; the reflected light of the rear pulse light has a light field distribution of $E_2$, an angular frequency of $\omega$, an initial phase of $\varphi_2$, and an electric field amplitude of $E_{r2}$; $\Delta\varphi(t)$ denotes a phase change caused by an external disturbance at a time t; $\psi(x)$ denotes a phase change introduced by the phase modulator; ψ(x) denotes a function with a value that increases linearly with an increase of a position x; there is a period of 2π between a value of the interference light signal and ψ(x).

It should be noted that in this embodiment, due to the linear phase modulation, ψ(x) is a function with the value increasing linearly with the increase of the position X. Due to the form of the trigonometric function, there is a period of 2π between the value of photocurrent signal I and ψ(x). Therefore, in this embodiment, the change of the position X corresponding to 2π phase modulation can be acquired according to the value of the photocurrent signals at different positions. In this way, this embodiment can extract photocurrent signals with different phase differences from the photocurrent signals at different positions, thereby realizing a variety of demodulation modes. In this embodiment, the change of the position X defines the sampling number.

In addition, in this embodiment, since the change of the position X corresponding to 2π phase modulation is acquired in real-time, the problem caused by the instability of the half-wave voltage of the phase modulator is solved.

The experimental device shown in FIG. 1 is used. The continuous laser light emitted by the narrow-linewidth laser enters the acousto-optic modulator with a modulation frequency of 150 MHz. After modulation, two pulses with a width of 300 ns and a spacing of 500 ns are acquired. The double-pulse signal generator sends a double-pulse electrical signal to the acousto-optic modulator for amplitude modulation. After amplitude modulation, the two pulses enter the phase modulator. After modulation, the phase of the partial region increases linearly. The double-pulse signal generator sends a synchronous signal to the signal generator as a trigger signal. The signal generator sends a linearly increasing electrical signal with a rise time of 200 ns and a peak value rising from 0 V to 10 V to the phase modulator for phase modulation. After the phase modulation, the double-pulse enters the erbium-doped fiber amplifier for amplification and then enters the grating array through the circulator for sensing. The returned interference light is received by the detector through the circulator. The data acquisition card acquires and sends the data to the computer for disturbance location and measurement.

Figure 2:
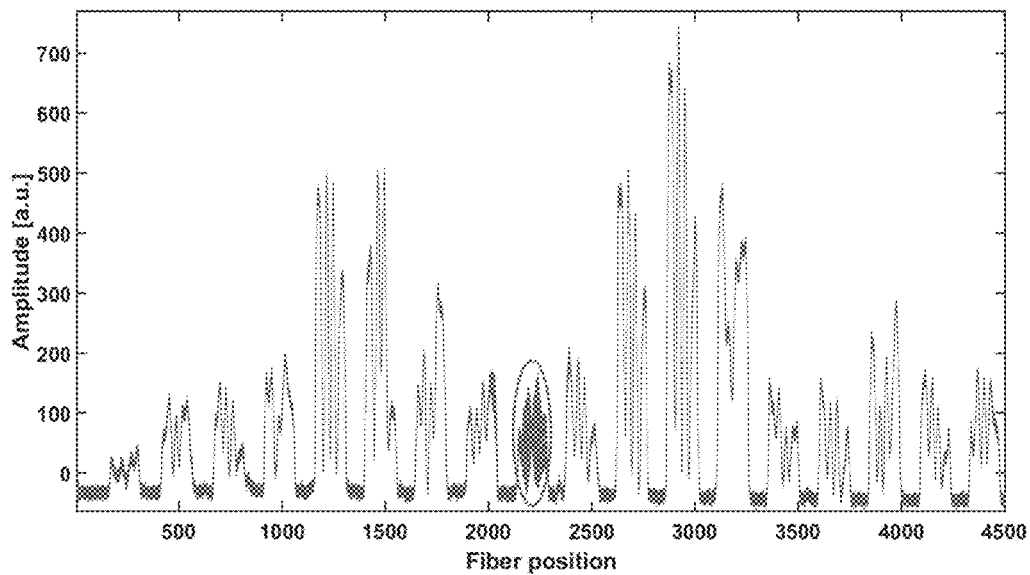
FIG. 2 is a schematic diagram of a pulse-reflected signal acquired from a grating near a vibration position.

A vibration source 400 meters close to the grating applies a sinusoidal signal with a frequency of 100 Hz and a voltage of 10 V. The disturbance is located by observing the amplitude fluctuation of the reflection peak. As shown in FIG. 2, the amplitude fluctuation of the reflection peak of the grating at the disturbance position is obviously larger than that in other regions.

Figure 3:
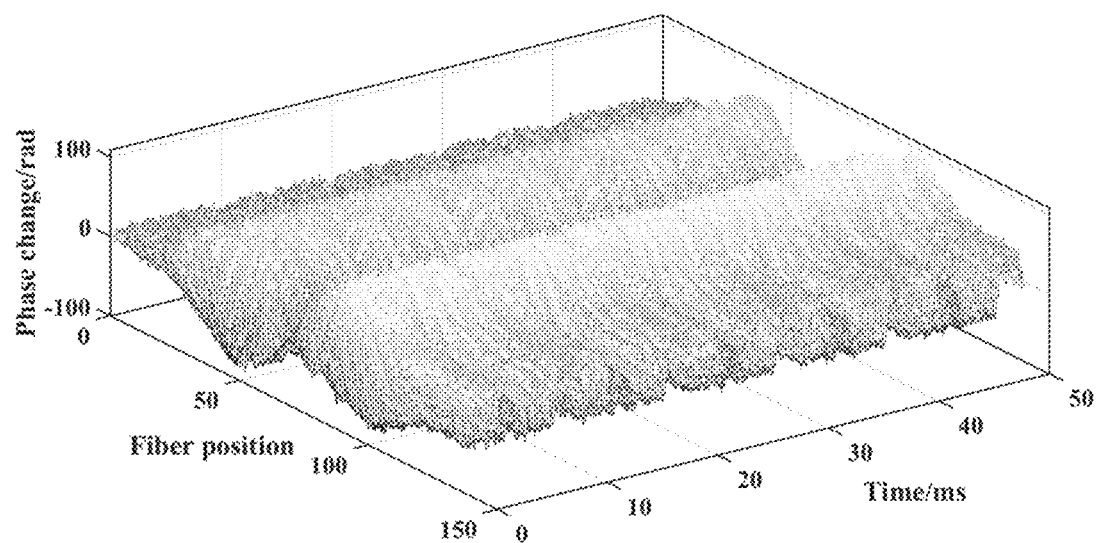
FIG. 3 is a schematic diagram (three-dimensional (3D) view) of a photocurrent signal acquired from the grating at the vibration position after linear phase modulation.
Figure 4:
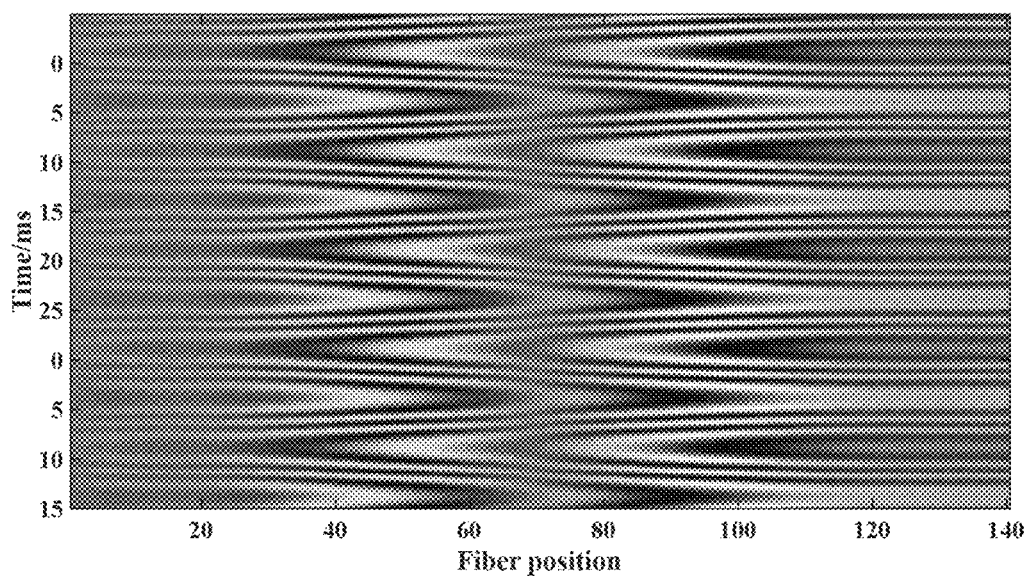
FIG. 4 is a schematic diagram (two-dimensional (2D) view) of the photocurrent signal acquired from the grating at the vibration position after linear phase modulation.
Figure 5A:
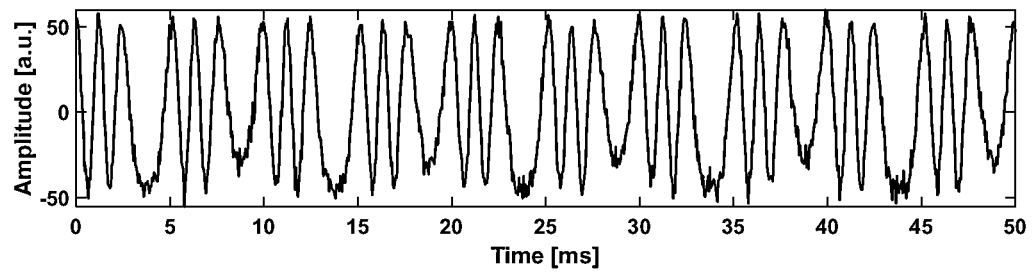
FIG. 5A-5B show a schematic diagram of two photocurrent signals with a phase difference of $\pi/2$.
Figure 5B:
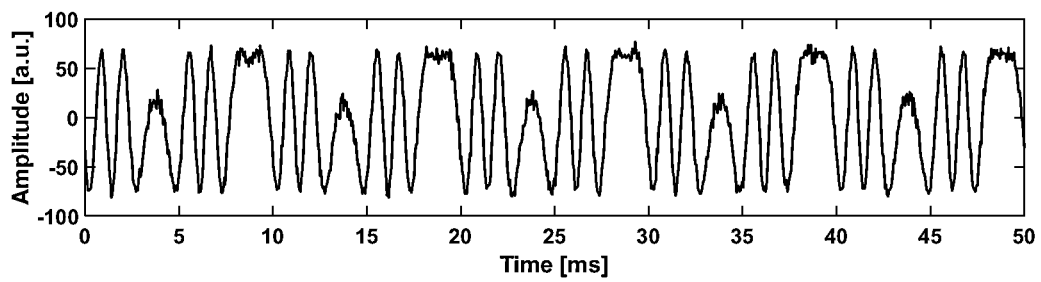
Figure 6:
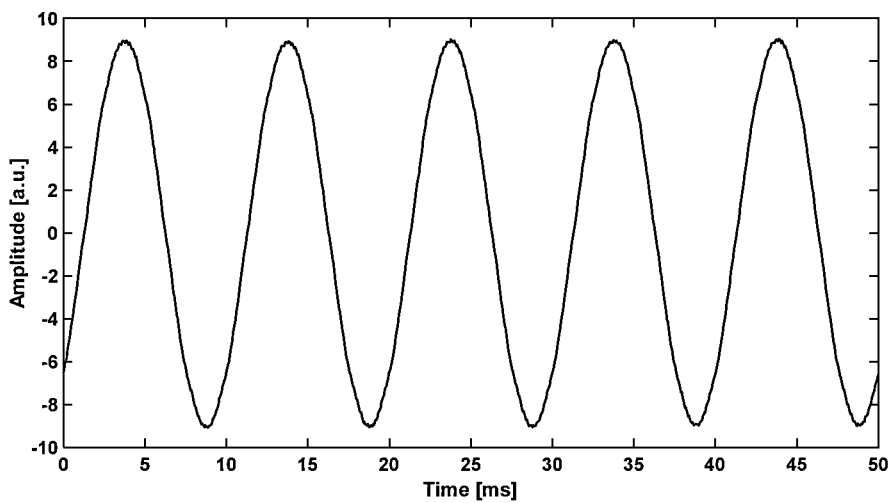
FIG. 6 is a schematic diagram of a demodulation result of $\pi/2$ phase difference demodulation.
Figure 7A:
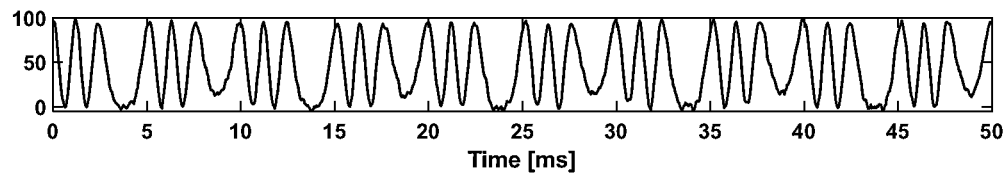
FIG. 7A-7C show a schematic diagram of three photocurrent signals with a phase difference of $2\pi/3$.
Figure 7B:
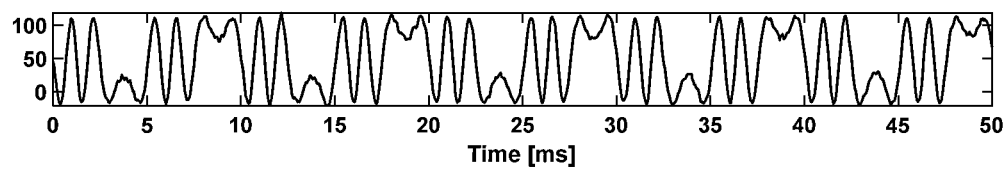
Figure 7C:
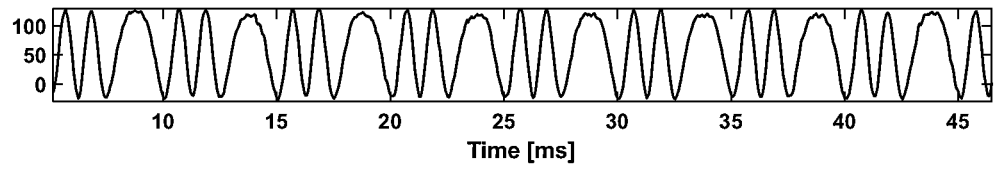
Figure 8:
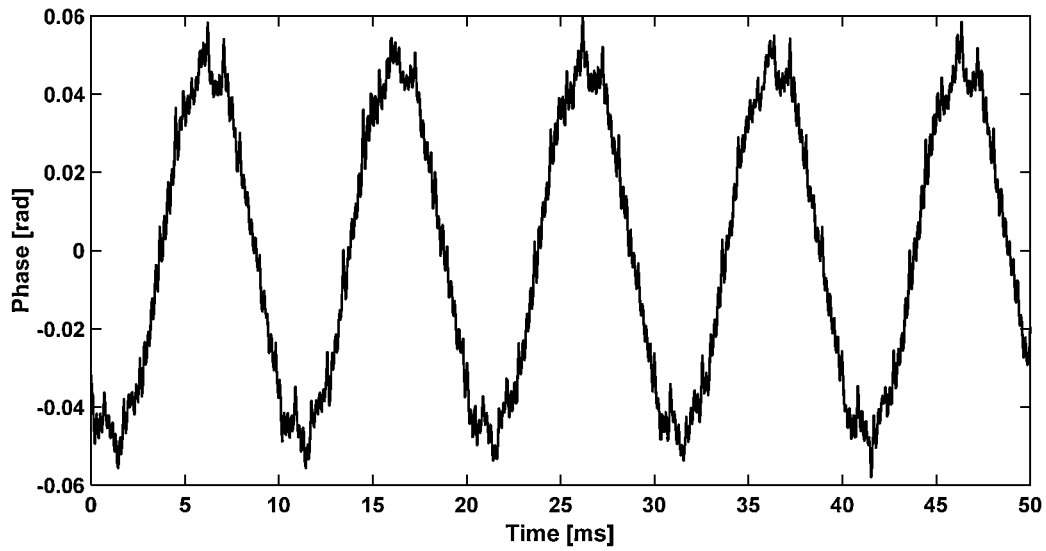
FIG. 8 is a schematic diagram of a demodulation result of $2\pi/3$ phase difference demodulation.
Figure 9A:
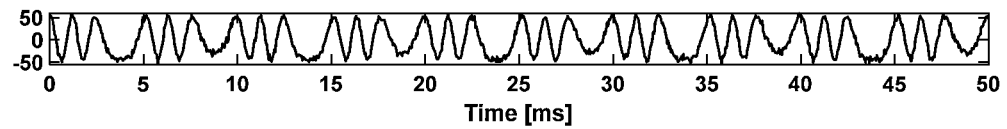
FIG. 9A-9D show a schematic diagram of four photocurrent signals with a phase difference of $\pi/4$.
Figure 9B:
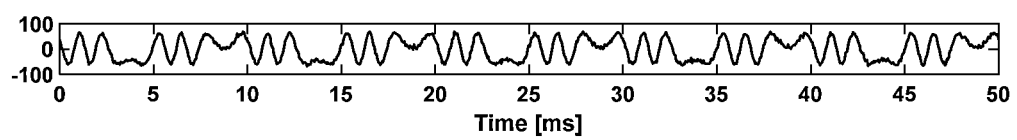
Figure 9C:
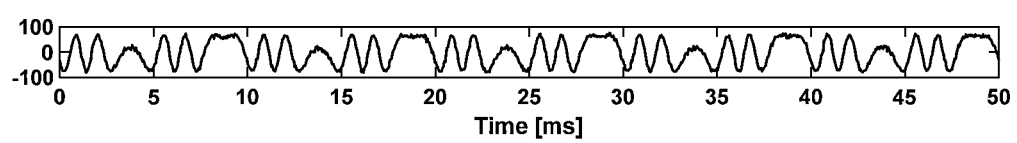
Figure 9D:
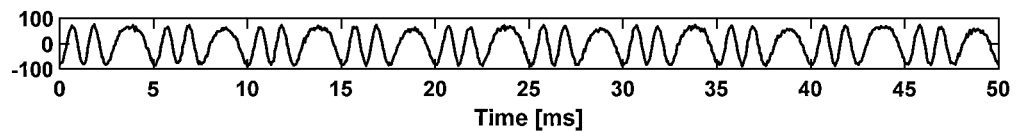
Figure 10:
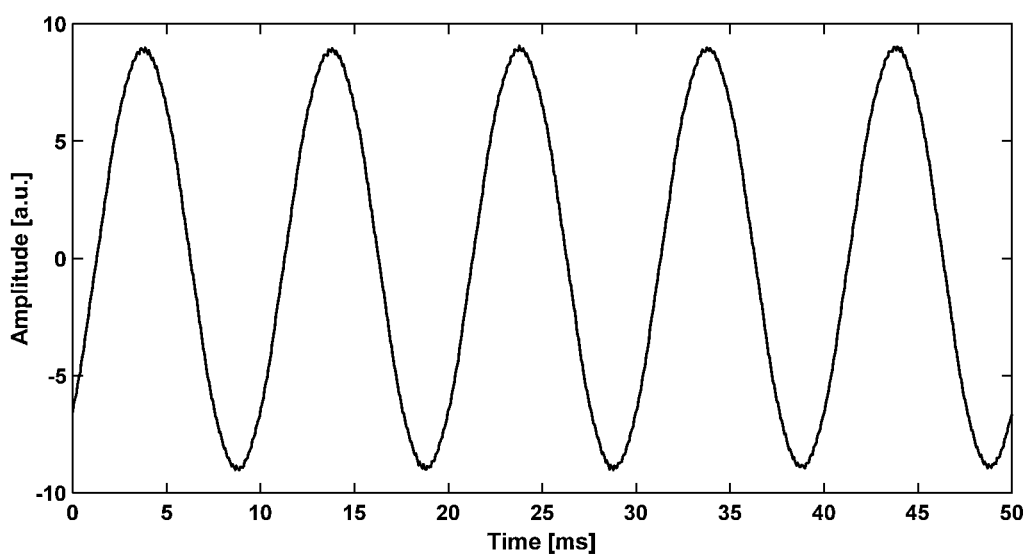
FIG. 10 is a schematic diagram of a demodulation result of $\pi/4$ phase difference demodulation.
Figure 11:
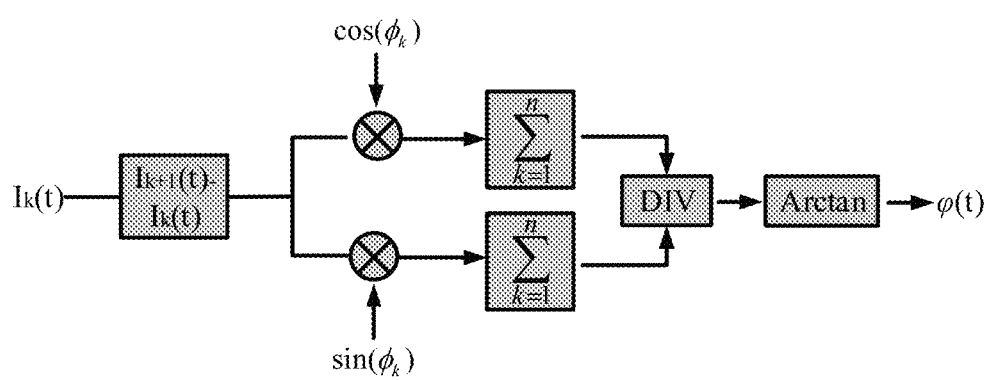
FIG. 11 is a flowchart of N-step phase difference demodulation.
Figure 12:
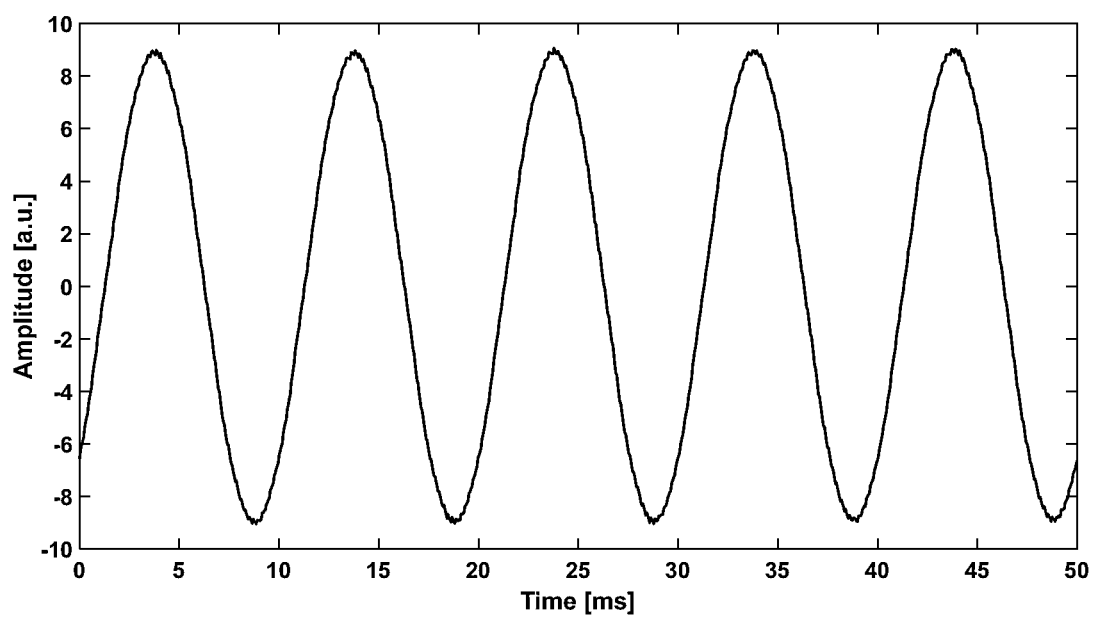
FIG. 12 is a schematic diagram of a demodulation result of N-step phase demodulation.

FIGS. 3 and 4 show the photocurrent signals at different positions of the grating at the disturbance position. In this embodiment, as shown in the 3D and 2D views, the photocurrent signals change periodically with the change of position, and their period corresponds to 2π phase modulation. In this embodiment, according to the 2D view, the sampling number corresponding to the 2π phase modulation is 36, that is, $N_{max}=36$.

Based on this, in this embodiment, the sampling number corresponding to the photocurrent signals with a phase difference of π/2 is 9, the sampling number corresponding to the photocurrent signals with a phase difference of 2π/3 is about 12, and the sampling number corresponding to the photocurrent signals with a phase difference of π/4 is about 5. Therefore, this embodiment can acquire two photocurrent signals with a phase difference of π/2, three photocurrent signals with a phase difference of 2π/3, and four photocurrent signals with a phase difference of π/4 as shown in FIGS. 5A-5B, 7A-7C, and 9A-9D, and the N-step phase demodulation requires signals acquired from 36 points. π/2 phase difference demodulation, 2π/3 phase difference demodulation, π/4 phase difference demodulation, and N-step phase difference demodulation are performed for these photocurrent signals respectively to acquire the demodulation results shown in FIGS. 6, 8, 10, and 12. Signals are acquired for a total of 0.050 seconds and 5 periods. That is, the frequency of the externally applied signals is 100 Hz, which is consistent with the actual frequency that is applied in the experiment.

Since 2π/3 phase difference demodulation does not require phase unwrapping, it can be applied to measure large strains, but its signal-to-noise ratio (SNR) is low due to integration and differentiation operations. π/2 phase difference demodulation and π/4 phase difference demodulation have high SNR but a small strain measurement range. π/4 phase difference demodulation uses more photocurrent and is more stable than π/2 phase difference demodulation. Therefore, in summary, if it is necessary to sense a large strain, it is recommended to select 2π/3 phase difference demodulation. If it is necessary to sense a normal strain with a high SNR, it is recommended to select π/4 phase difference demodulation. If it is required that the demodulation result is virtually not affected by fading, N-step phase difference demodulation is recommended.

Embodiment 2

This embodiment provides a distributed weak grating array sensing method with multiple demodulation modes, including the following steps:

S1. Continuous light is generated, and an amplitude of the continuous light is modulated to divide the continuous light into the front pulse light and rear pulse light, where the front pulse light has a width equal to the width of the rear pulse light.

S2. The phase of the front pulse light or the rear pulse light is linearly modulated to linearly increase the phase of a corresponding partial region.

S3. The rear pulse light and the front pulse light after the phase modulation processing are compensated, and the compensation result is input into a sensing fiber. A photoelectric detector detects an interference signal generated by the superimposition of reflected light on adjacent gratings. A data acquisition card digitizes an acquired electrical signal to acquire a time-domain signal of interference light, such that, in the sensing fiber fused with the grating array, the spacing of the grating array is basically consistent.

S4. Acquired time-domain signals are analyzed, and a disturbance is located by observing a fluctuation of a reflection peak signal.

S5. N signals with different modulated phases in a phase period are acquired from photocurrent signals at a disturbance position.

S6. A phase demodulation method is determined according to an actual requirement. 2π/3 phase difference demodulation is selected for a disturbance with a strain greater than a preset strain threshold, otherwise π/4 phase difference demodulation is selected. π/2 phase difference demodulation is selected for a disturbance desiring a demodulation speed greater than a preset demodulation speed threshold. N-step phase difference demodulation is selected for a disturbance desiring a demodulation result not to be affected by fading, and all signals with a phase difference at the disturbance position are used.

S7. Multiple sets of demodulation results are acquired from the photocurrent signals at the disturbance position, and a final demodulation result is acquired by averaging.

Specifically:

In step S1, the modulating an amplitude of the continuous light to divide the continuous light into front pulse light and rear pulse light specifically includes:

An acousto-optic modulator is controlled through a double-pulse control electrical signal with a voltage change from 0 V to 2 $V_\pi$.

The acousto-optic modulator modulates the amplitude of the continuous light, where $V_\pi$ denotes a half-wave voltage of a phase modulator.

In this embodiment, the sensing method further includes the photocurrent signals being selected according to different phase differences.

In step S5, the phase period is $2\pi$.

For $\pi/2$ phase difference demodulation, two photocurrent signals with a phase difference of ¼ periods are selected for demodulation.

For $2\pi/3$ phase difference demodulation, three photocurrent signals with a phase difference of ⅓ periods are selected for demodulation.

For $\pi/4$ phase difference demodulation, four photocurrent signals with a phase difference of ⅛ periods are selected for demodulation.

For N-step phase difference demodulation, $N_{max}$ photocurrent signals are selected for demodulation.

N is a positive integer greater than or equal to 1, and $N_{max}$ is the total sampling number of the grating at the disturbance position.

Furthermore, this embodiment also discloses the N-step phase difference demodulation.

Through the N-step phase difference demodulation, N light signals of one phase period are acquired at a grating, which are expressed as:

$$I_k(t) = A + B\cos[\varphi(t) + \phi_k], k=1,2,\ldots,N,$$

where A and B denote a DC value and an alternating current (AC) coefficient; $\varphi(t)$ denotes a phase change caused by a disturbance; and $\phi_k$ denotes an additional phase brought by the phase modulator, $$\phi_k = k \cdot \frac{2\pi}{N} \in [0, 2\pi].$$

Taking the derivative of the above equation leads to:

$$I'_k(t) = -B\varphi'(t)\sin[\varphi(t) + \phi_k] = -B\varphi'(t)\{\sin[\varphi(t)]\cos\phi_k + \cos[\varphi(t)]\sin\phi_k\}.$$

Multiplying the derivative of each photocurrent signal by the corresponding $\cos(\phi i)$ and $\sin(\phi i)$ and summing leads to:

$$\sum_{k=1}^{N} I'_k(t)\cos(\phi_k) = -B\varphi'(t)\sum_{k=1}^{N}\{\sin[\varphi(t)]\cos^2\phi_k + \cos[\varphi(t)]\sin\phi_k\cos\phi_k\}$$

and $\sum_{k=1}^{N} I'_k(t)\sin(\phi_k) = -B\varphi'(t)\sum_{k=1}^{N}\{\sin[\varphi(t)]\sin\phi_k\cos\phi_k + \cos[\varphi(t)]\sin^2\phi_k\}.$ The integral result in one period is as follows:

$$\begin{cases} \sum_{i=1}^{N}\sin(\phi_k)\cos(\phi_k) = 0 \\ \sum_{i=1}^{N}\cos^2(\phi_k) = \frac{N}{2} \\ \sum_{i=1}^{N}\sin^2(\phi_k) = \frac{N}{2} \end{cases}.$$

Therefore, $$\sum_{k=1}^{N} I'_k(t)\cos(\phi_k) = -\frac{N}{2}B\varphi'(t)\sin[\varphi(t)]$$

and $\sum_{k=1}^{N} I'_k(t)\sin(\phi_k) = -\frac{N}{2}B\varphi'(t)\cos[\varphi(t)].$ Dividing the two equations leads to:

$$\frac{\sum_{k=1}^{N} I'_k(t)\cos(\phi_k)}{\sum_{k=1}^{N} I'_k(t)\sin(\phi_k)} = \frac{-\frac{N}{2}B\varphi'(t)\sin[\varphi(t)]}{-\frac{N}{2}B\varphi'(t)\cos[\varphi(t)]} = \tan[\varphi(t)]$$

The wrapped phase is demodulated by arctangent:

$$\varphi(t) = \arctan\left(\frac{\sum_{k=1}^{N} I'_k(t)\cos(\phi_k)}{\sum_{k=1}^{N} I'_k(t)\sin(\phi_k)}\right).$$

Finally, phase unwrapping is performed on the wrapped phase to realize phase demodulation. Because the phase relationship between each photocurrent signal is controllable and the influence of a few fading points in the N signals is ignorable, the demodulation result that is not affected by fading can be acquired.

The present disclosure can realize multiple demodulation modes including $\pi/2$ phase difference demodulation, $2\pi/3$ phase difference demodulation, $\pi/4$ phase difference demodulation, and N-step phase difference demodulation without changing the system structure to meet different application requirements. In addition, the present disclosure eliminates the influence of the instability of the half-wave voltage of the phase modulator and ensures the stability of the phase difference of the photocurrent signals used for demodulation.

Since the device disclosed in the embodiment corresponds to the method disclosed in the embodiment, its description is relatively simple, and reference may be made to a partial description of the method for relevant contents.

The above description of the disclosed embodiments enables those skilled in the art to achieve or practice the present disclosure. Various amendments to these embodiments are apparent to those of ordinary skill in the art, and the general principles defined herein may be implemented in other embodiments without departing from the spirit or scope of the present disclosure. Therefore, the present disclosure is not limited to the embodiments shown herein but falls within the widest scope consistent with the principles and novel features disclosed herein.

What is claimed is:

1. A distributed weak grating array sensing system with multiple demodulation modes, comprising a narrow-linewidth laser, an acousto-optic modulator, a phase modulator, a double-pulse signal generator, a signal generator, an erbium-doped fiber amplifier, a circulator, a sensing fiber fused with a weak grating array, a photoelectric detector, a data acquisition card, and a computer, wherein
the narrow-linewidth laser is configured to emit a continuous light to the acousto-optic modulator;
the double-pulse signal generator is configured to control the acousto-optic modulator and send out a synchronous signal as a trigger signal of the signal generator;
the acousto-optic modulator is configured to modulate the continuous light under a control of the double-pulse signal generator to generate a double-pulse light with a predetermined width and spacing;
the phase modulator is configured to modulate a phase of a front pulse light or a rear pulse light of the double-pulse light under a control of the signal generator to linearly increase a phase of a corresponding partial region of phase modulation;
the erbium-doped fiber amplifier is configured to amplify a power of the double-pulse light output by the phase modulator and output the double-pulse light to the circulator, wherein the double-pulse light enters the sensing fiber through the circulator;
the sensing fiber is configured to enable a reflected light of the double-pulse light to superimpose and interfere in gratings to generate an interference light, wherein the interference light returns to the circulator;
the photoelectric detector is configured to convert a returned interference light signal into an electrical signal corresponding to the returned interference light signal and output the electrical signal to the data acquisition card, and the data acquisition card is configured to digitize the electrical signal and output the electrical signal to the computer; and
the computer is configured to perform demodulation by analyzing acquired time-domain signals, locating a disturbance by observing a fluctuation of a reflection peak signal, acquiring N signals with different modulated phases in a phase period from photocurrent signals at a disturbance position, wherein N is a positive integer greater than or equal to 1, and selecting, for photocurrent signals with a phase difference of $\Phi$, photocurrent signals with a sampling number difference of $\Phi N/2\pi$ for demodulation.

2. The distributed weak grating array sensing system according to claim 1, wherein the double-pulse light with the predetermined width and spacing modulated by the acousto-optic modulator comprises two pulses with a width of $t_1$ and a spacing satisfying $t_2 = 2nL/c$, wherein c denotes a propagation speed of light in vacuum, n denotes an equivalent refractive index of the sensing fiber, and L denotes a spacing between every two adjacent gratings in the weak grating array.

3. The distributed weak grating array sensing system according to claim 1, wherein a control electrical signal sent by the signal generator has a same period as a control electrical signal of the double-pulse signal generator, and has a voltage change from 0 V to 2V, wherein $V_\pi$ denotes a half-wave voltage of the phase modulator.

4. The distributed weak grating array sensing system according to claim 1, wherein the phase modulator is configured to modulate the phase of the front pulse light or the rear pulse light, wherein an electric field of the reflected light of the front pulse light is expressed as:

$$E_1(t) = E_{r1} \exp[j\omega t + j\varphi_1 + j\Delta\varphi(t) + \psi(x)].$$

an electric field of the reflected light of the rear pulse light is expressed as:

$$E_2(t) = E_{r2} \exp[j\omega t + j\varphi_2];$$

the reflected light of the front pulse light and the reflected light of the rear pulse light interfere after superposition, and the interference light signal is expressed as:

$$I_1(t) = E_{r1}^2 + E_{r2}^2 + 2E_{r1}E_{r2} \cos[\Delta\phi + \Delta\varphi(t) + \psi(x)], \text{ where}$$

$$\Delta\phi = \varphi_1 - \varphi_2.$$

ignoring an initial phase difference and a direct current (DC) term of the two beams of reflected light, the interference light signal is expressed as:

$$I_1(t) = 2E_{r1}E_{r2} \cos[\Delta\varphi(t) + \psi(x)],$$

wherein the reflected light of the front pulse light has a light field distribution of $E_1$, an angular frequency of $\omega$, an initial phase of $\varphi_1$, and an electric field amplitude of $E_{r1}$; the reflected light of the rear pulse light has a light field distribution of $E_2$, an angular frequency of $\omega$, an initial phase of $\varphi_2$, and an electric field amplitude of $E_{r2}$; $\Delta\varphi(t)$ denotes a phase change caused by an external disturbance at a time t; j denotes an imaginary unit, $\psi(x)$ denotes a phase change introduced by the phase modulator; $\psi(x)$ denotes a function with a value that increases linearly with an increase of a position x; and there is a period of $2\pi$ between a value of the interference light signal and $\psi(x)$.

5. A distributed weak grating array sensing method with multiple demodulation modes, comprising the following steps:
S1: generating a continuous light and modulating an amplitude of the continuous light to divide the continuous light into a front pulse light and a rear pulse light, wherein the front pulse light has a width equal to a width of the rear pulse light;
S2: linearly modulating a phase of the front pulse light or the rear pulse light to increase the phase of a corresponding partial region linearly;
S3: compensating powers of the rear pulse light and the front pulse light with an erbium-doped fiber amplifier after the modulating; inputting a compensation result into a sensing fiber; detecting, by a photoelectric detector, an interference signal generated by superimposition of a reflected light on adjacent gratings; and digitizing, by a data acquisition card, an acquired electrical signal to acquire a time-domain signal of an interference light;
S4: analyzing acquired time-domain signals and locating a disturbance by observing a fluctuation of a reflection peak signal;
S5: acquiring N signals with different modulated phases in a phase period from photocurrent signals at a disturbance position;

S6: determining a phase demodulation method according to an actual requirement; selecting $2\pi/3$ phase difference demodulation for a disturbance with a strain greater than a preset strain threshold, or selecting $\pi/4$ phase difference demodulation for a disturbance with the strain less than or equal to the preset strain threshold; selecting $\pi/2$ phase difference demodulation for a disturbance desiring a demodulation speed greater than a preset demodulation speed threshold; selecting N-step phase difference demodulation for a disturbance desiring a demodulation result not to be affected by fading, and using all signals with a phase difference at the disturbance position; and S7: acquiring multiple sets of demodulation results from the photocurrent signals at the disturbance position and acquiring a final demodulation result by averaging.

6. The distributed weak grating array sensing method according to claim 5, wherein in step S1, the step of modulating the amplitude of the continuous light to divide the continuous light into the front pulse light and the rear pulse light specifically comprises:

controlling an acousto-optic modulator through a double-pulse control electrical signal with a voltage change from 0 V to $2V_\pi$; and modulating, by the acousto-optic modulator, the amplitude of the continuous light;

wherein $V_\pi$ denotes a half-wave voltage of a phase modulator.

7. The distributed weak grating array sensing method according to claim 5, further comprising the step of selecting the photocurrent signals according to different phase differences, wherein, in step S5, the phase period is $2\pi$:

for the $\pi/2$ phase difference demodulation, selecting two photocurrent signals with a phase difference of ¼ periods for demodulation;

for the $2\pi/3$ phase difference demodulation, selecting three photocurrent signals with a phase difference of ⅓ periods for demodulation;

for the $\pi/4$ phase difference demodulation, selecting four photocurrent signals with a phase difference of ⅛ periods for demodulation; and for the N-step phase difference demodulation, selecting $N_{max}$ photocurrent signals for demodulation;

wherein, N is a positive integer greater than or equal to 1, and $N_{max}$ is a total sampling number of the grating at the disturbance position.

* * * * *